(12) United States Patent
Suresh et al.

(10) Patent No.: US 12,266,356 B2
(45) Date of Patent: Apr. 1, 2025

(54) CONTEXT-SENSITIVE ACTIONS WITHIN CLIENT DEVICE

(71) Applicant: ARRIS Enterprises LLC, Suwanee, GA (US)

(72) Inventors: Sandeep Guddekoppa Suresh, Bangalore (IN); Vinod Jatti, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 472 days.

(21) Appl. No.: 17/487,281

(22) Filed: Sep. 28, 2021

(65) Prior Publication Data

US 2022/0165265 A1  May 26, 2022

Related U.S. Application Data

(60) Provisional application No. 63/117,552, filed on Nov. 24, 2020.

(51) Int. Cl.
*G10L 15/22* (2006.01)
*G06Q 10/1093* (2023.01)
(Continued)

(52) U.S. Cl.
CPC .......... *G10L 15/22* (2013.01); *G06Q 10/1095* (2013.01); *G10L 15/1822* (2013.01); *G10L 2015/088* (2013.01)

(58) Field of Classification Search
CPC ............ G10L 15/22; G10L 15/1822; G10L 2015/088; G10L 15/30; G10L 15/26; G10L 25/54; G10L 15/02; G10L 2015/223; G10L 2015/225; G10L 13/00; G06F 12/145; G06F 21/52; G06F 2212/1052; G06F 16/954; G06F 21/554; G06F 21/577; G06F 3/011; G06F 3/013; G06F 3/014; G06F 3/016; G06F 3/041; G06F 16/285; G06F 16/90324; G06F 16/9535; G06F 9/46; G06Q 30/02; G06Q 50/01; G06Q 50/26
See application file for complete search history.

(56) References Cited

U.S. PATENT DOCUMENTS

7,523,397 B2 * 4/2009 Cheung ................... G06F 9/542
715/710
8,200,520 B2 * 6/2012 Chen ................... G06Q 10/109
705/7.18
(Continued)

*Primary Examiner* — Abdelali Serrou
(74) *Attorney, Agent, or Firm* — Wenderoth, Lind & Ponack, L.L.P.

(57) ABSTRACT

Aspects of the present disclosure are drawn to a network device comprising: a microphone configured to detect speech from a user; a memory having an event keyword and a date keyword stored therein; and a processor configured to execute instructions stored on the memory to cause the network device to: store, into the memory, detected speech for a predetermined period of time; parse the stored detected speech; determine a future event of the user based on a detected event keyword in the parsed detected speech that corresponds to the event keyword; determine a date of the determined future event based on a detected date keyword in the parsed detected speech that corresponds to the date keyword; create a calendar for the user; and log the future event into the calendar.

9 Claims, 5 Drawing Sheets

(51) Int. Cl.
  *G10L 15/18*  (2013.01)
  *G10L 15/08*  (2006.01)

(56) References Cited

U.S. PATENT DOCUMENTS

| | | | | |
|---|---|---|---|---|
| 10,803,730 | B2* | 10/2020 | Coria | G08B 21/24 |
| 10,956,874 | B2* | 3/2021 | Gurdin | G06F 9/451 |
| 2002/0196280 | A1* | 12/2002 | Bassett | H04L 67/52 |
| | | | | 715/751 |
| 2006/0208861 | A1* | 9/2006 | Stroupe | G06Q 10/109 |
| | | | | 340/309.7 |
| 2007/0168892 | A1* | 7/2007 | Brush | G06Q 10/109 |
| | | | | 715/963 |
| 2008/0244425 | A1* | 10/2008 | Kikin-Gil | G06Q 10/109 |
| | | | | 715/764 |
| 2008/0319818 | A1* | 12/2008 | Gurdin | G06Q 10/109 |
| | | | | 705/7.24 |
| 2011/0130958 | A1* | 6/2011 | Stahl | G06Q 10/1093 |
| | | | | 701/533 |
| 2014/0059487 | A1* | 2/2014 | Baumann | G06Q 10/109 |
| | | | | 715/811 |
| 2014/0070945 | A1* | 3/2014 | Dave | G06Q 10/1095 |
| | | | | 340/540 |
| 2014/0253319 | A1* | 9/2014 | Chang | H04M 1/72454 |
| | | | | 340/521 |
| 2021/0073293 | A1* | 3/2021 | Fenton | G06F 16/90332 |
| 2021/0125610 | A1* | 4/2021 | Cheung | G06F 16/9535 |

* cited by examiner

CONTEXT-SENSITIVE ACTIONS WITHIN CLIENT DEVICE

BACKGROUND

Embodiments of the present disclosure relate to context-sensitive actions within a client device.

SUMMARY

Aspects of the present disclosure are drawn to a network device comprising: a microphone configured to detect speech from a user; a memory having an event keyword and a date keyword stored therein; and a processor configured to execute instructions stored on the memory to cause the network device to: store, into the memory, detected speech for a predetermined period of time; parse the stored detected speech; determine a future event of the user based on a detected event keyword in the parsed detected speech that corresponds to the event keyword; determine a date of the determined future event based on a detected date keyword in the parsed detected speech that corresponds to the date keyword; create a calendar for the user; and log the future event into the calendar.

In some embodiments, the processor is configured to execute instructions stored on the memory to additionally cause the network device to provide an alarm to the user prior to the date of the determined future event.

In some embodiments, the memory includes a buffer, and the processor is configured to execute instructions stored on the memory to additionally cause the network device to store the detected speech into the buffer in a first in first out procedure.

Other aspects of the present disclosure are drawn to a method of using a network device. The method comprises: detecting, via a microphone, speech from a user; storing, via a processor configured to execute instructions stored on a memory, detected speech into the memory for a predetermined period of time; parsing, via a processor configured to execute instructions stored on a memory, the detected speech; determining, via the processor, a future event of the user based on the parsed detected speech; determining, via the processor, a date of the determined future event based on the parsed detected speech; creating, via the processor, a calendar for the user; and logging, via the processor, the future event into the calendar.

In some embodiments, the method further comprises providing, via the processor, an alarm to the user prior to the date of the determined future event.

In some embodiments of the method, the memory includes a buffer, and storing comprises storing the detected speech into the buffer in a first in first out procedure.

Other aspects of the present disclosure are drawn to a non-transitory, computer-readable media having computer-readable instructions stored thereon, the computer-readable instructions being capable of being read by a network device, wherein the computer-readable instructions are capable of instructing the network device to perform the method comprising: detecting, via microphone, speech from a user; parsing, via a processor configured to execute instructions stored on a memory, the detected speech; determining, via the processor, a future event of the user based on the parsed detected speech; determining, via the processor, a date of the determined future event based on the parsed detected speech; creating, via the processor, a calendar for the user; and logging, via the processor, the future event into the calendar.

In some embodiments, the computer-readable instructions are capable of instructing the network device to perform the method further comprising providing, via the processor, an alarm to the user prior to the date of the determined future event.

In some embodiments, the computer-readable instructions are capable of instructing the network device to perform the method wherein the memory includes a buffer, and wherein the storing comprises storing the detected speech into the buffer in a first in first out procedure.

Other aspects of the present disclosure are drawn to a network device for use by a user and with a network, a second network device and a second user, the second network device being configured to transmit voice data over the network to the network device based on speech from the second user, comprising: a microphone configured to detect speech from the user; a memory having user identifying data stored therein, the user identifying data corresponding to the user; and a processor configured to execute instructions stored on the memory to cause the network device to: mute the microphone; receive the voice data; parse the voice data; determine whether the parsed voice data includes user addressing data; and unmute the microphone when the user addressing data matches the user identifying data.

Other aspects of the present disclosure are drawn to a method of using a network device with a user and with a network, a second network device and a second user, the second network device being configured to transmit voice data over the network to the network device based on speech from the second user, comprising: muting the microphone via a processor configured to execute instructions stored on a memory having user identifying data stored therein, the user identifying data corresponding to the user; receiving, via the processor, the voice data; parsing, via the processor, the voice data; determining, via the processor, whether the parsed voice data includes user addressing data; and unmuting, via the processor, the microphone when the user addressing data matches the user identifying data.

Other aspects of the present disclosure are drawn to a non-transitory, computer-readable media having computer-readable instructions stored thereon, the computer-readable instructions being capable of being read by a network device for use by a user and with a network, a second network device and a second user, the second network device being configured to transmit voice data over the network to the network device based on speech from the second user, wherein the computer-readable instructions are capable of instructing the network device to perform the method comprising: muting the microphone via a processor configured to execute instructions stored on a memory having user identifying data stored therein, the user identifying data corresponding to the user; receiving, via the processor, the voice data; parsing, via the processor, the voice data; determining, via the processor, whether the parsed voice data includes user addressing data; and unmuting, via the processor, the microphone when the user addressing data matches the user identifying data.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
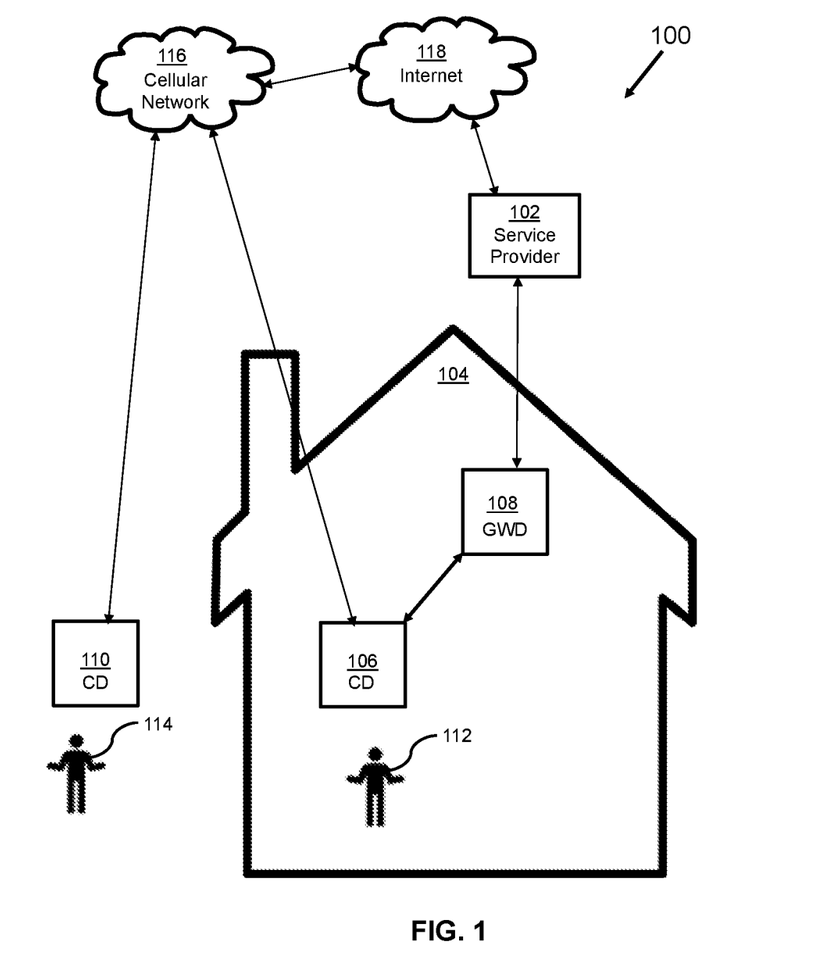
FIG. 1 illustrates structural components implementing an electronic communication network.

FIG. 1 illustrates structural components implementing an electronic communication network 100.

As shown in FIG. 1, network 100 includes a gateway device (GWD) 108; a plurality of client devices, a sample of which are illustrated as a client device 106 and a client device 110; a service provider 102; an Internet 118; a cellular network 116; a residence 104; a user 112, and a user 114.

As shown in the figure, client device 106 is arranged to communicate with client device 110 by way of gateway device 108, service provider 102, Internet 118, and cellular network 116. Client device 106 is also arranged to communicate with client device 110 by way of cellular network 116.

Gateway device 108, also referred to as a gateway, residential gateway, or RG, is an electronic device that is to be located so as to establish a local area network (LAN) at a consumer premises. The consumer premises can include a residential dwelling, office, or any other business space of a user. The terms home, office, and premises may be used synonymously herein.

Gateway device 108 may be any device or system that is operable to allow data to flow from one discrete network to another, which in this example is from a wireless local area network (WLAN) created and maintained by gateway device 108 in FIG. 1 to Internet 118. Gateway device 108 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway device 108 establishes, or is part of a WLAN, using Wi-Fi for example, such that client device 106 is able to communicate wirelessly with gateway device 108. In particular, gateway device 108 is able to communicate wirelessly directly with client device 106. The term Wi-Fi as used herein may be considered to refer to any of Wi-Fi 4, 5, 6, 6E, or any variation thereof.

Further, it should be noted that gateway device 108 is able to communicate with service provider 102 via physical media/wiring, which may optionally be a wireless communication system, such as 4G, or 5G, and further is able to connect to Internet 118, via service provider 102.

Service provider 102 includes head-end equipment such as server computers (e.g., automatic configuration server ACS, cable modem termination system CMTS) that enable a content provider, such as a cable television provider, a satellite television provider, an internet service provider, or multiple-systems operator (MSO), to provide content (such as audio/video content and/or internet service) either through physical media/wiring, such as a coaxial network, an optical fiber network, and/or DSL, or a wireless network, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a DOCSIS network, a fiber optics network (e.g, FTTH (fiber to the home), FTTX (fiber to the X), or hybrid fiber-coaxial (HFC)), a digital subscriber line (DSL), a public switched data network (PSDN), a global Telex network, or a 2G, 3G, 4G or 5G, for example.

Gateway device 108 serves as a gateway or access point to Internet 118 (or otherwise as mentioned above), for one or more electronic devices, referred to generally herein as client device 106, that wirelessly communicate with gateway device 108 via, e.g., Wi-Fi. Client device 106 can be a desk top computer, laptop computer, electronic tablet device, smart phone, appliance, or any other so-called internet of things equipped device that is equipped to communicate information via a WLAN.

Within a WLAN, electronic devices are often referred to as being stations. In IEEE 802.11 (Wi-Fi) terminology, a station (abbreviated as STA) is a device that has the capability to use the 802.11 protocol. For example, a station may be a laptop, a desktop PC, PDA, access point or Wi-Fi phone. An STA may be fixed, mobile or portable. Generally, in wireless networking terminology, a station, wireless client, and node are often used interchangeably, with no strict distinction existing between these terms. A station may also be referred to as a transmitter or receiver based on its transmission characteristics. IEEE 802.11-2012 defines station as: logical entity that is a singly addressable instance of a medium access control (MAC) and physical layer (PHY) interface to the wireless medium (WM).

For purposes of discussion, consider the following situation with reference to FIG. 1. Let client device 106 be a cell phone used by user 112 and client device 110 be a cell phone used by user 114. User 112 and user 114 are having a conversation about an upcoming event. For purposes of discussion, let the event be a wedding. User 114 is providing details to user 112 about the wedding, including where the wedding will be held and the date on which the wedding occurs. As user 114 talks about the wedding, user 112 attempts to memorize the wedding event information because user 112 does not have a convenient means to write down or record the wedding information. However, because user 112 is busy, after the phone conversation with user 114 ends, user 112 gets distracted by something else occurring in residence 104 and forgets to write down the wedding information that they learned about from the conversation with user 114. Time passes, and user 112 forgets about the wedding. As a result, when the date of the wedding arrives, user 112 does not go to the wedding because they forgot about it, and there are many unhappy people at the wedding because user 112 did not participate in the event.

For purposes of discussion, consider another situation in which user 112 and user 114 are participating in a conference call using client devices 106 and 110. Let user 112 mute client device 106 because user 112 has a son or daughter nearby, in residence 104, with whom they are having a side conversation with and user 112 does not want user 114 to hear the side conversation. Then when user 112 is ready to say something to user 114, let user 112 forget to unmute client device 106. User 112 starts talking, but user 114 does not hear user 112 because client device 106 is still muted. Because user 114 is unable to hear user 112 talk, user 114 ends the conference call because they mistakenly believe that user 112 has dropped off of the conference call.

Both examples illustrated in the previous two situations would cause a frustrating experience for the user of client device 106. In the first situation, user 112 forgets details related to an important event because of a lack of a convenient way to record the event information during a phone conversation. In the second situation, user 112 forgets to unmute client device 106, and as a result, the conversation that user 112 was participating in with user 114 was prematurely ended.

What is needed is a convenient way for a client device to assist a user in recording event information during a conversation or to assist a user in unmuting a previously muted device during a conversation.

A system and a method in accordance with the present disclosure solves the problem of recording event information during a conversation and unmuting a previously muted device during a conversation.

In accordance with the present disclosure, a client device stores and parses speech during a conversation, and takes an action based on the content of the parsed speech. In one embodiment, the client device detects, captures, and stores event information from the parsed speech and sets an alarm for the user. In another embodiment, the client device unmutes a second, previously muted client device.

A system, method, or non-transitory, computer-readable media in accordance with aspects of the present disclosure improves the user experience by providing a convenient way for a user to have important event details recorded and reminders for those events set automatically. It also provides a convenient way for a user to have a previously muted device become unmuted without having to remember to do so.

An example system and method for capturing and recording event information during a conversation or muting a previously muted device during a conversation in accordance with aspects of the present disclosure will now be described with reference to FIGS. 2-5.

Figure 2:
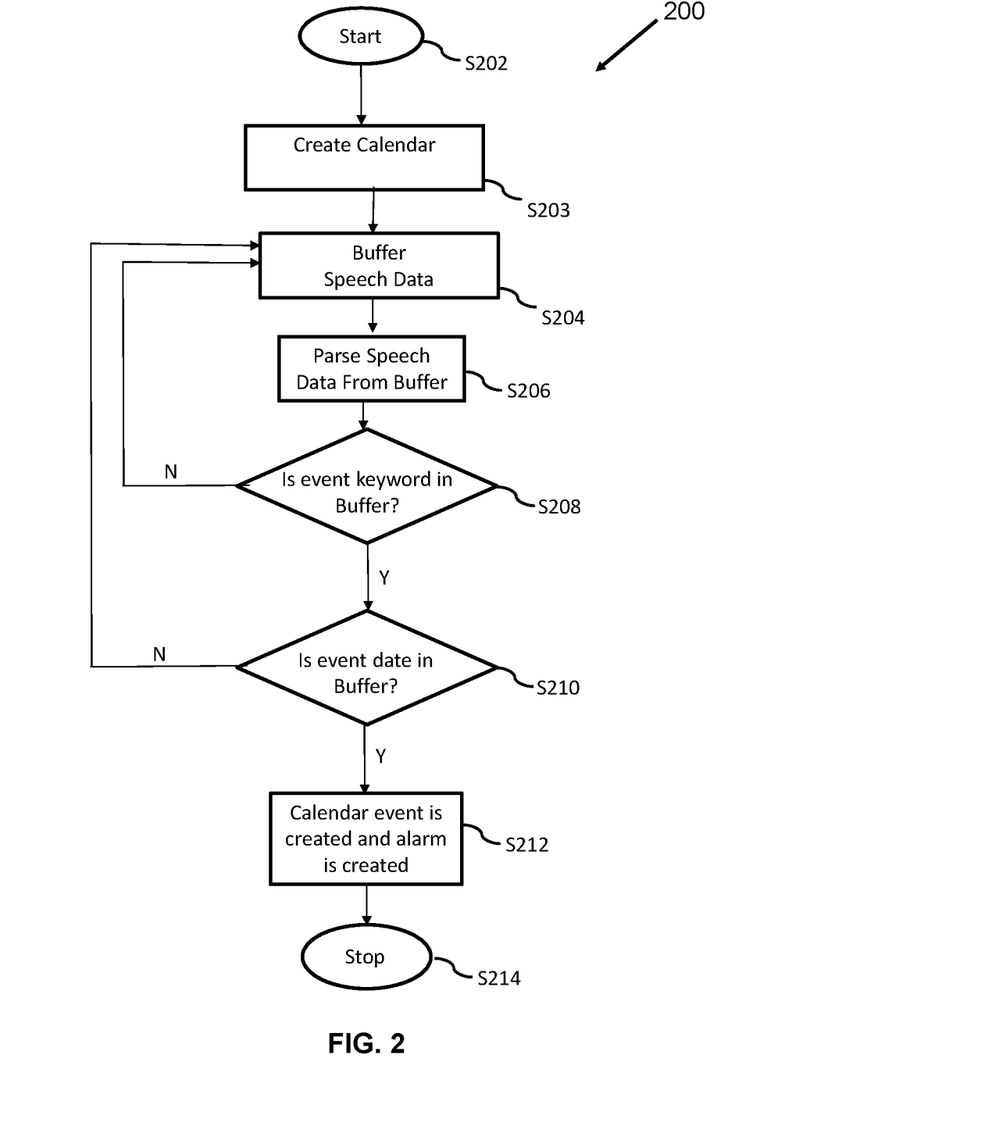
FIG. 2 illustrates an example algorithm in accordance with aspects of the present disclosure.

FIG. 2 illustrates an example algorithm 200 to be executed by a processor for collecting speech data, determining whether or not event keywords and event dates are within the speech data during a predetermined time, and setting a calendar entry and alarm for an event.

Figure 3:
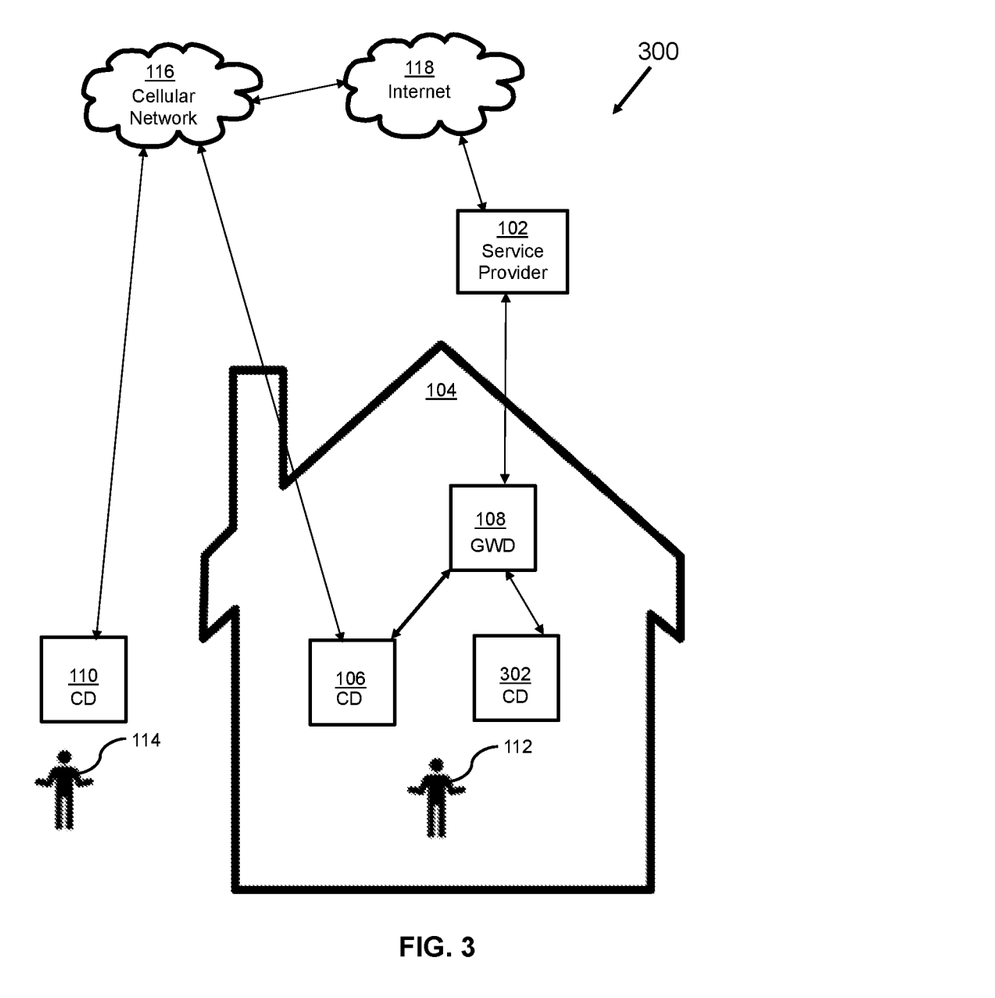
FIG. 3 illustrates structural components implementing an electronic communication network in accordance with aspects of the present disclosure.

FIG. 3 illustrates structural components implementing an electronic communication network 300. Electronic communication network 300 is identical to electronic communication 100 illustrated in FIG. 1 with the addition of client device 302.

As shown in FIG. 3, client device 302 is arranged to communicate with client device 106 by way of gateway device 108.

Figure 4:
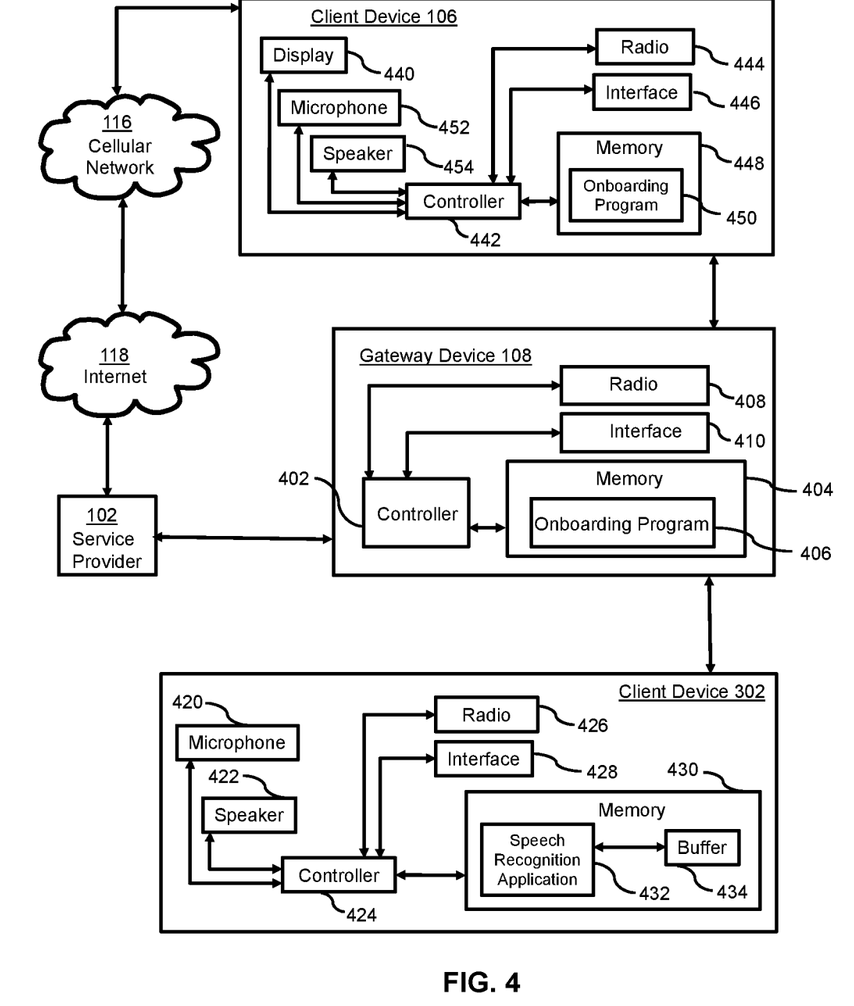
FIG. 4 illustrates an exploded view of two client devices and a gateway device in accordance with aspects of the present disclosure.

FIG. 4 illustrates an exploded view of client device 106, gateway device 108, and client device 302 of FIG. 3.

As shown in FIG. 4, gateway device 108 includes: a controller 402; a memory 404, which has stored therein an onboarding program 406; at least one radio, a sample of which is illustrated as a radio 408; and an interface circuit 410.

In this example, controller 402, memory 404, radio 408, and interface circuit 410 are illustrated as individual devices. However, in some embodiments, at least two of controller 402, memory 404, radio 408, and interface circuit 410 may be combined as a unitary device. Whether as individual devices or as combined devices, controller 402, memory 404, radio 408, and interface circuit 410 may be implemented as any combination of an apparatus, a system and an integrated circuit. Further, in some embodiments, at least one of controller 402, memory 404, and interface circuit 410 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large-scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 402 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of gateway device 108 in accordance with the embodiments described in the present disclosure. Memory 404 can store various programming, and user content, and data. Interface circuit 410 can include one or more connectors, such as RF connectors, or Ethernet connectors, and/or wireless communication circuitry, such as 5G circuitry and one or more antennas. Interface circuit 410 receives content from service provider 102 (as shown in FIG. 4) by known methods, non-limiting examples of which include terrestrial antenna, satellite dish, wired cable, DSL, optical fibers, or 5G as discussed above. Through interface circuit 410, gateway device 108 receives an input signal, including data and/or audio/video content, from service provider 102 and can send data to service provider 102.

Radio 408 (and preferably two or more radios) may also be referred to as a wireless communication circuit, such as a Wi-Fi WLAN interface radio transceiver and is operable to communicate with client devices 106 and 302. Radio 408 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Gateway device 108 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

Client device 106 includes: a controller 442; a memory 448, which has stored therein an onboarding program 450; and at least one radio, a sample of which is illustrated as a radio 444; an interface 446; a display 440, a microphone 452, and a speaker 454.

In this example, controller 442, memory 448, radio 444, interface 446, display 440, microphone 452, and speaker 454 are illustrated as individual devices. However, in some embodiments, at least two of controller 442, memory 448, radio 444, interface 446, display 440, microphone 452, and speaker 454 may be combined as a unitary device. Further, in some embodiments, at least one of controller 442 and memory 448 may be implemented as a computer having tangible computer-readable media for carrying or having computer-executable instructions or data structures stored thereon.

Controller 442 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 106 in accordance with the embodiments described in the present disclosure.

Memory 448 can store various programming, and user content, and data.

Radio 444, may include a Wi-Fi WLAN interface radio transceiver that is operable to communicate with client device 302 and gateway device 108, as shown in FIG. 4, and also may include a cellular transceiver operable to communicate with client device 110 through cellular network 116. Radio 444 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Client device 106 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol.

Client device 302 includes: a controller 424; a memory 430, which has stored therein a speech recognition application 432 and a buffer 434; at least one radio, a sample of which is illustrated as a radio 426; an interface 428; a microphone 420; and a speaker 422.

In this example, controller 424, memory 430, radio 426, interface 428, microphone 420, and speaker 422 are illustrated as individual devices. However, in some embodiments, at least two of controller 424, memory 430, radio 426, interface 428, microphone 420, and speaker 422 may be combined as a unitary device. Further, in some embodiments, at least one of controller 424 and memory 430 may be implemented as a computer having tangible computer-readable media for carrying or having computer-executable instructions or data structures stored thereon.

Controller 424 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 302 in accordance with the embodiments described in the present disclosure.

Memory 430 can store various programming, and user content, and data.

Radio 426, may include a Wi-Fi WLAN interface radio transceiver that is operable to communicate with client device 106 and gateway device 108, as shown in FIG. 4. Radio 426 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Client device 302 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol.

Insofar as gateway device 108 provides connection to service provider 102, such as an MSO, gateway device 108 can be equipped with connectors to connect with a television or display device, and can also include programming to execute an electronic program guide and/or other suitable graphical user interface (GUI), and can with such configuration be referred to as a so called set top box. Such a set top box can be included in the system shown in FIG. 3 as gateway device 108 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable the gateway device to be a so-called smart media device.

As will be described in more detail below, controller 424 is configured to execute instructions stored on memory 430 to cause client device 302 to store, into memory 430, detected speech for a predetermined period of time; parse the stored detected speech; determine a future event of the user based on a detected event keyword in the parsed detected speech that corresponds to the event keyword; determine a date of the determined future event based on a detected date keyword in the parsed detected speech that corresponds to the date keyword; create a calendar for the user; and log the future event into the calendar.

As will be described in more detail below, controller 424 is configured to execute instructions stored on memory 430 to cause client device 302 to provide an alarm to the user prior to the date of the determined future event.

As will be described in more detail below, controller 424 is configured to execute instructions stored on memory 430 to cause client device 302 to store the detected speech into buffer 434 in a first in first out procedure.

As will be described in more detail below, controller 424 is configured to execute instructions stored on memory 430 to cause client device 302 to mute microphone 452; receive voice data; parse the voice data; determine whether the parsed voice data includes user addressing data; and unmute microphone 452 when the user addressing data matches the user identifying data.

For purposes of discussion, consider the following situation, which was previously discussed with reference to FIG. 1, now with reference to FIG. 3. Let client device 106 be a cell phone used by user 112, client device 302 be a smart media device used by user 112, and client device 110 be a cell phone used by user 114. User 112 and user 114 are having a conversation about an upcoming event. For purposes of discussion, let the event be a wedding. User 114 is providing details to user 112 about the wedding, including where the wedding will be held and the date on which the wedding occurs. Let client device 302 be physically close to user 112 and client device 106 so that any sound emitted by either user 112 or client device 106 can be picked up by the microphone in client device 302.

In accordance with aspects of the present disclosure, client device 302 contains an application program that detects the word "wedding" and the date of the wedding in the speech from user 112. Client device 302 contains a calendar that records the wedding event, the wedding date, and sets an alarm to remind user 112 of the wedding.

This will now be discussed with reference to FIGS. 2 and 4.

Returning to FIG. 2, algorithm 200 to be executed by a processor starts (S202), a calendar is created (S203). For example, as shown in FIG. 4, controller 424 executes instructions stored in memory 430 to create a calendar. The calendar may be edited, wherein calendar events may be added, modified or deleted. The calendar is stored as a data structure within memory 430.

Returning to FIG. 2, after a calendar is created (S203), speech data is buffered (S204). For example, returning to FIG. 4, microphone 420 picks up speech data from speaker 454 and sends the speech data to controller 424 which then sends the speech data to memory 430 where it is stored in buffer 434.

In an example embodiment, the speech data is stored in memory 430 in a first-in, first-out (FIFO) manner over a predetermined period of time. In a non-limiting example, the predetermined period of time is 90 seconds, wherein a moving window of speech data over the 90 second time period is stored in memory 430. In some embodiments, this predetermined time period may be modified by a user.

Returning to FIG. 2, after speech data is buffered (S204), the speech data within the buffer is parsed (S206). For example, returning to FIG. 4, after microphone 420 picks up speech data from speaker 454 and sends the speech data to controller 424 which then sends the speech data to memory 430 where it is stored in buffer 434, the speech data within buffer 434 is parsed.

Controller 424 may parse the speech data within buffer 434 by any known manner, a non-limiting example of which includes using probabilistic context-free grammar. The parsed portion of the speech data will therefore include individual words, in addition to groups of words (phrases).

Returning to FIG. 2, after the speech data within the buffer is parsed (S206), it is determined if an event keyword is within the buffer (S208). For example, returning to FIG. 4, after the speech data with buffer 434 is parsed, controller 424 determines if an event keyword is within buffer 434. Speech recognition application 432 contains a list of event keywords such as "wedding," "birthday," "graduation," and "anniversary." Controller 424 will determine if one of those event keywords is within buffer 434.

Returning to FIG. 2, if it is determined an event keyword is within the buffer (S208), it is determined if the event date is within the buffer (S210). For example, returning to FIG. 4, if controller 424 determines that one of a list of event keywords is within buffer 434, controller 424 determines if an event date also within buffer 434. In this example, speech recognition application 432 contains a list of event date words such as the days of the week, (for example, Monday, Tuesday, Wednesday, etc.), numerical dates (for example, the numbers 1 through 31 either in ordinal or cardinal form), years (for example, any year from the current year forward such as 2021, 2025), and words related to dates (for example, "date," "week," "day," "year," "month"). After determining if an event keyword is within buffer 434, controller 424 determines if a proper combination of event date words that compose a calendar date (such as Saturday, June 15th) is also within buffer 434.

Returning to FIG. 2, if it is determined that the event date is within the buffer (S210), a calendar event is created and a corresponding alarm is created (S212). For example, returning to FIG. 4, if controller 424 determines that an event date is within buffer 434, controller 424 would create a calendar event and corresponding alarm for the event. In some embodiments, the calendar event and corresponding alarm could be in client device 302. In other embodiments, the calendar and corresponding alarm could be in client device 106. In some embodiments, the calendar and corresponding alarm could be in both client device 106 and client device 302.

Returning to FIG. 2, if is determined that an event keyword is not in the buffer (S208), speech data is buffered (S204). For example, returning to FIG. 4, if controller 424 determines that an event keyword is not in buffer 434, then the content in buffer 434 is replaced with new speech data.

Returning to FIG. 2, if is determined that the event date is not in the buffer (S210), speech data is buffered (S204). For example, returning to FIG. 4, if controller 424 determines that an event date is not in buffer 434, then the content in buffer 434 is replaced with new speech data.

Returning to FIG. 2, after a calendar event is created and a corresponding alarm is created (S212), algorithm 200 stops (S214). For example, returning to FIG. 4, after a calendar event and corresponding alarm are created in either client device 302 or client device 106 as discussed previously, algorithm 200 stops.

In the non-limiting example embodiment discussed above, a processor within a client device is programed to parse and identify user conversation in-home (ex: either talking over phone or having in-home conversation). Further, the processor within the client device is additionally programmed to automatically identify future events and corresponding event-dates and store it in the user's calendar. Still further, the processor within the client device is additionally programmed to set an alarm for the identified event date. This enables the user to get a reminder and auto 'bookkeeping' of the calendar. The alarm may take the form of: an audible alarm, e.g., a beep provided by speaker 422; a notification, e.g., a text or email; a tactile response, e.g., a vibration of client device 302; and combinations thereof. It should be noted that in some embodiments, this feature may be either enabled or disabled based on the user's choice.

In some embodiments, to avoid continuous processing of voice data (either by way of the service provider or by way of the client device), the client device may store the most recent voice data over a period of time in a first in-first out (FIFO) manner. In a non-limiting example the period of time is 90 seconds. However, this period of time by be configured by the user. In this manner, whether user speaks keywords, either related to the event or related to date/time, only the last 90 sec of voice data may be processed for storing calendar event and for setting alarm.

Another aspect of the present disclosure is drawn to automatically muting or unmuting a user based on context in voice data.

For purposes of discussion, consider the following situation, now with reference to FIG. 3. Let user 112 and user 114 be participating in a conference call using client devices 106 and 110. In this example, let user 112 has a son or daughter nearby, in resident 104, with whom they are having a side conversation. Let client device 302 be physically close to user 112 and client device 106 so that any sound emitted by either user 112 or client device 106 can be picked up by the microphone in client device 302.

In accordance with aspects of the present disclosure, after initiation of a phone call between user 112 and user 114, client device 302 would mute client device 106. Then when user 114 addresses user 112 by name and says a keyword related to the conference call, client device 302 would detect the user identifying data and the user addressing data in the speech from user 114 and unmute client device 106 in preparation for speech from user 112 directed towards user 114. This will now be discussed with reference to FIGS. 3-5.

Figure 5:
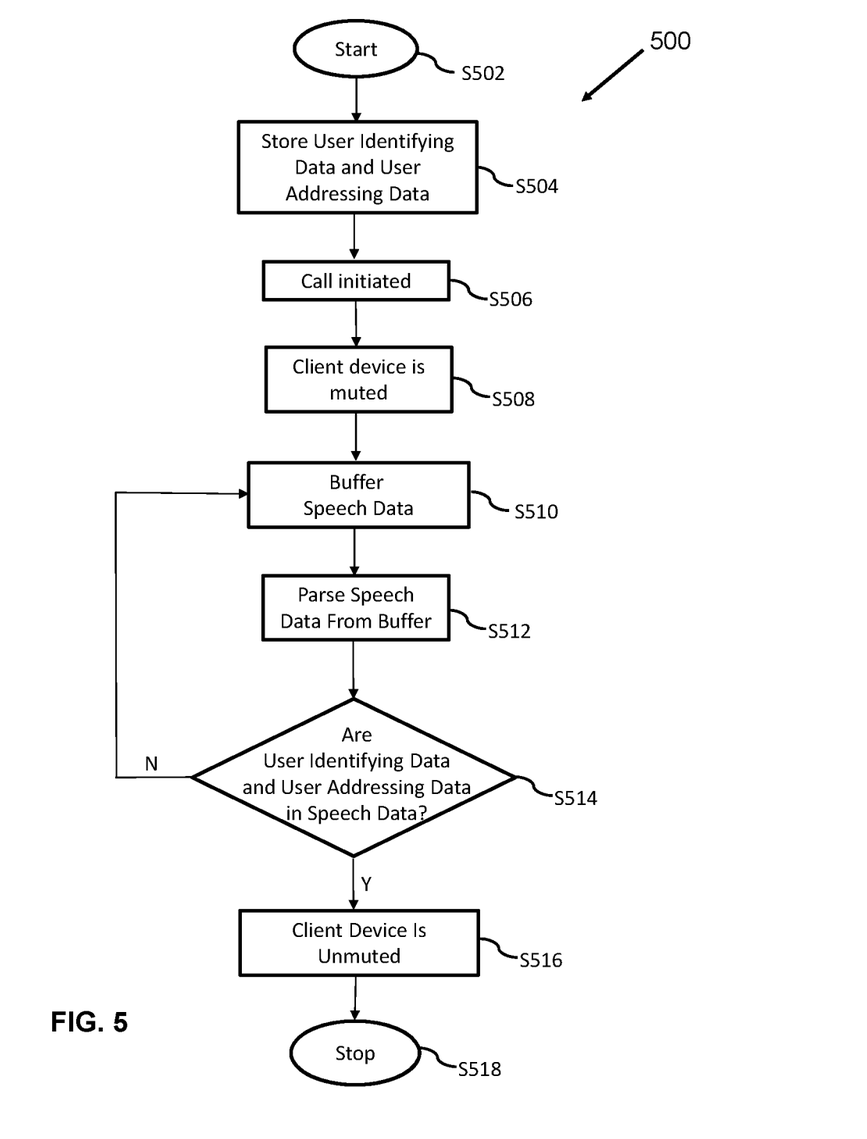
FIG. 5 illustrates another example algorithm in accordance with aspects of the present disclosure.

FIG. 5 illustrates an example algorithm 500 to be executed by a processor for collecting speech data and unmuting a client device based on the presence of specific words within the speech data during a predetermined time.

As shown in FIG. 5, algorithm 500 to be executed by a processor starts (S502), and user identifying data and user addressing data are stored in memory (S504). For example, returning to FIG. 4, user identifying data and user addressing data are stored in memory 430 of client device 302.

User identifying data includes data corresponding to parsed voice data that identifies the user of client device 302. Non limiting examples of user identifying data include names associated with the user of client device 302, e.g., the actual name of the user of client device 302, nicknames associated with the user of client device 302, and generic addressing names such as "you," "ma'am," "sir," etc.

User addressing data includes data corresponding to parsed voice data associated with inviting the user of client device 302 to speak. Non limiting examples of user addressing data include phrases such as "would you like to comment," "do you have anything to say," "can you provide some insight on that," etc.

In some embodiments, the user identifying data and user addressing data may be stored in memory 430 of client device 302 as a priori data. In some embodiments, the user identifying data and user addressing data may be stored in memory 430 by way of user 112 speaking into microphone 420 of client device 302. In other embodiments, the user identifying data and user addressing data may be stored in memory 430 by an application taking text data from client device 106 and transmitting it to memory 430 in client device 302.

Returning to FIG. 5, after user identifying data and user addressing data are stored in memory (S504), a call is initiated (S506). For example, returning to FIG. 3 and FIG. 4, after user identifying data and user addressing data are stored in memory 430 of client device 302, as illustrated in FIG. 4, user 112, using client device 106, as shown in FIG. 3, initiates a phone call to user 114.

Returning to FIG. 5, after a call is initiated (S506), the client device is muted (S508). For example, returning to FIG. 3 and FIG. 4, after user 112, who is using client device 106, calls user 114, who is using client device 110, and a phone conversation begins between user 112 and user 114, microphone 452 of client device 106, as shown in FIG. 4, is muted.

Returning to FIG. 5, after the client device is muted (S508), speech data is buffered (S510). This operation may be performed in a manner similar to that discussed above with reference to FIG. 2 (S204). For example, returning to FIG. 4, after microphone 452 of client device 106 is muted, speech data from user 114 is broadcast by speaker 454 of client device 106, captured by microphone 420 of client device 302, and sent to buffer 434 in client device 302.

Returning to FIG. 5, after speech data is buffered (S510), speech data from the buffer is parsed (S512). This operation may be performed in a manner similar to that discussed above with reference to FIG. 2 (S206). For example, returning to FIG. 4, after speech data from user 114 is sent to buffer 434 in client device 302, controller 424 parses the speech data in buffer 434.

Returning to FIG. 5, after speech data from the buffer is parsed (S512), it is determined if user identifying data and user addressing data are in the speech data (S514). For example, returning to FIG. 4, after controller 424 parses the speech data in buffer 434, controller 424 determines if any user identifying data and user addressing data are in the parsed speech data within buffer 434. As discussed previously, the user identifying data and user addressing data could be a statement such as, "John, do you have anything to add?" wherein the word "John" is identified as user identifying data and the statement "do you have anything to add" is identified as user addressing data. In accordance with aspects of the present disclosure, controller 424 is looking for the presence of both user identifying data and user addressing data in the parsed speech data in buffer 434 to unmute client device 106.

Returning to FIG. 5, if it is determined that user identifying data and user addressing data are in the speech data (S514), the client device is unmuted (S516). For example, returning to FIGS. 3 and 5, if speech recognition application 432 determines that user identifying data and user addressing data are in the parsed speech data within buffer 434, client device 106 is unmuted so that user 112 can speak into microphone 452 and be heard by user 114.

Returning to FIG. 5, if it is determined that user identifying data and user addressing data are not in the speech data (S514), speech data is buffered (S510). For example, returning to FIG. 4, if controller 424 within client device 302 determines that user identifying data and user addressing data are not in the parsed speech data within buffer 434, client device 106 remains muted and new speech data is sent to buffer 434.

Returning to FIG. 5, after the client device is unmuted (S516), algorithm 500 stops (S518). For example, returning to FIG. 4, after client device 106 is unmuted, algorithm 500 ends.

In the example embodiment discussed above with reference to FIG. 5, a client device can perform dynamic context sensitive actions using voice interface. Therefore, while in a group conference call, the client device can auto control muting and unmuting.

It should be noted that in some embodiments of the non-limiting example embodiment discussed above with reference to FIG. 5, when the client device automatically mutes/unmutes, it produces unique symbolic (short duration) sound, by which the user will understand the that muting/unmuting has been performed. If the muting/unmuting has been incorrectly performed, then user may override by prompting "mute"/"unmute". In some embodiments, if the client device includes a visual indicated, e.g., a light emitting diode (LED), to indicate a mute status, then the indicator may be used as auto status indicator.

Some other non-limiting example scenarios where client device 302 may be automatically unmuted in accordance with aspects of the present disclosure include: when there is only background noise, but user 112 is not speaking; when user 112 is talking to someone in residence 104, for example saying to children "can you go and play outside."

Traditional client devices provide many conveniences but do not offer hands-free automated ways to record event information or unmute a client device based on the context of speech.

A system and a method in accordance with the present disclosure solves the problem of recording event information during a conversation and unmuting a previously muted device during a conversation. In accordance with a system and method of present disclosure, a client device stores and parses speech during a conversation, and takes an action based on the content of the parsed speech. In one embodiment, the client device detects, captures, and stores event information from the parsed speech and sets an alarm for the user. In another embodiment, the client device unmutes a second, previously muted client device based on detected speech data.

A system, method, or non-transitory, computer-readable media in accordance with aspects of the present disclosure improves the user experience by providing a convenient way for a user to have important event details recorded and reminders for those events set automatically. It also provides a convenient way for a user to have a previously muted device become unmuted without having to remember to do so.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A network device in a network comprising: a microphone;
a speaker;
a memory having a user identifying data, user addressing data, event keyword and a date keyword stored therein; and
a processor coupled to the memory and the microphone, wherein the processor executes instructions stored on the memory to cause the network device to:
detect, by the microphone, speech from a user associated with another network device related to a call between the network device and the another network device;
parse the detected speech for content;
take an automated action based on the content of the parsed detected speech, wherein the automated action automatically mutes the microphone;
after muting the microphone, store, into the memory, the detected speech for a predetermined period of time;
after muting the microphone, broadcast by the speaker the detected speech;
determine, based on the parsing, that the content matching the user identifying data and the user addressing data;
take another automated action based on the content matching the user identifying data and the user addressing data, wherein the another automated action automatically unmutes the microphone;
detect, by the microphone, additional speech from the user associated with the another network device;
determine a future event of the user based on additional content detected in the additional speech to the event keyword;
determine a date of the determined future event based on additional content detected in the additional speech corresponding to the date keyword;
create, in the network device, a calendar event of a calendar for the user, wherein the calendar event is stored as a data structure within the memory, and wherein the calendar event can be modified; and
log the future event into the calendar.

2. The network device of claim 1, wherein the processor is configured to execute instructions stored on the memory to additionally cause the network device to provide an alarm to the user prior to the date of the determined future event.

3. The network device of claim 1,
wherein the memory includes a buffer, and
wherein the processor is configured to execute instructions stored on the memory to additionally cause the network device to store the detected speech into the buffer in a first in first out procedure.

4. A method of using a network device in a network, the method comprising:
detecting, via microphone, speech from a user associated with another network device related to a call between the network device and the another network device;
parsing, via a processor configured to execute instructions stored on a memory, the detected speech for content;
taking, via the processor, an automated action based on the content of the parsed detected speech, wherein the automated action automatically mutes the microphone;
after muting the microphone, storing, into the memory, the detected speech for a predetermined period of time;
after muting the microphone, broadcasting by a speaker the detected speech;
determining, based on the parsing, that the content matches user identifying data and user addressing stored in the memory;
taking another automated action based on the content matching the user identifying data and the user addressing data, wherein the another automated action automatically unmutes the microphone;
detecting, by the microphone, additional speech from the user associated with the another network device;
determining, via the processor, a future event of the user based on additional content detected in the additional speech corresponding to the event keyword;
determining, via the processor, a date of the determined future event based on the additional content detected in the additional speech corresponding to the date keyword;
creating, via the processor, in the network device, a calendar for the user, wherein the calendar event is stored as a data structure within the memory, and wherein the calendar event can be modified; and
logging, via the processor, the future event into the calendar.

5. The method of claim 4, further comprising providing, via the processor, an alarm to the user prior to the date of the determined future event.

6. The method of claim 4,
wherein the memory includes a buffer, and
wherein the storing comprises storing the detected speech into the buffer in a first in first out procedure.

7. A non-transitory, computer-readable media of a network device in a network having computer-readable instructions stored thereon, the computer-readable instructions being capable of being read by the network device, wherein the computer-readable instructions are capable of instructing the network device to perform the method comprising:
detecting, via microphone, speech from a user associated with another network device related to a call between the network device and the another network device;
parsing, via a processor configured to execute instructions stored on a memory, the detected speech for content;
taking an automated action based on the content of the parsed detected speech, wherein the automated action automatically mutes the microphone;
after muting the microphone, storing, into the memory, the detected speech for a predetermined period of time;
after muting the microphone, broadcasting by the speaker the detected speech;
determining, based on the parsing, that the content matches user identifying data and user addressing data stored in the memory;
taking another automated action based on the content matching the user identifying data and the user addressing data, wherein the another automated action automatically unmutes the microphone;
detecting, by the microphone, additional speech from the user associated with the another network device;
determining, via the processor, a future event of the user based on additional content detected in the additional speech;

determining, via the processor, a date of the determined future event based on the additional content detected in the additional speech corresponding to the date keyword;

creating, via the processor, in a network device, a calendar event of a calendar for the user, wherein the calendar event is stored as a data structure within the memory, and wherein the calendar event can be modified; and logging, via the processor, the future event into the calendar.

8. The non-transitory, computer-readable media of claim 7, wherein the computer-readable instructions are capable of instructing the network device to perform the method further comprising providing, via the processor, an alarm to the user prior to the date of the determined future event.

9. The non-transitory, computer-readable media of claim 7, wherein the computer-readable instructions are capable of instructing the network device to perform the method wherein the memory includes a buffer, and wherein the storing comprises storing the detected speech into the buffer in a first in first out procedure.

* * * * *